US010247355B1

(12) United States Patent
Lee

(10) Patent No.: US 10,247,355 B1
(45) Date of Patent: Apr. 2, 2019

(54) TELESCOPIC POLE MOUNTING SYSTEM

(71) Applicant: Terry Lee, Concord, NH (US)

(72) Inventor: Terry Lee, Concord, NH (US)

( * ) Notice: Subject to any disclaimer, the term of this patent is extended or adjusted under 35 U.S.C. 154(b) by 0 days.

(21) Appl. No.: 15/889,995

(22) Filed: Feb. 6, 2018

(51) Int. Cl.
  *F16M 13/00* (2006.01)
  *F16M 13/02* (2006.01)
  *B25G 1/04* (2006.01)
  *H04N 5/225* (2006.01)

(52) U.S. Cl.
  CPC ............ *F16M 13/022* (2013.01); *B25G 1/04* (2013.01); *H04N 5/2253* (2013.01)

(58) Field of Classification Search
  CPC ............ F16M 13/022; F16M 2200/00; H04N 5/2253; B25G 1/04
  See application file for complete search history.

(56) References Cited

U.S. PATENT DOCUMENTS 7,113,145 B1 * 9/2006 Noble .................. H01Q 1/1228
    248/218.4
8,302,922 B1 * 11/2012 Robinson ............... A47G 25/08
    211/107

* cited by examiner

*Primary Examiner* — Amy J. Sterling

(57) ABSTRACT

A telescopic pole mounting system is provided. The system comprises an adjustable spacer, a first end of the spacer coupled to a bracket and a clamp that partially encircles a vertical pole, ends of the clamp attached to the bracket. The system also comprises a cup attached to the spacer, movement of the cup causing one of expansion and contraction of the spacer. The system also comprises a telescopic pole that attaches to the cup, and raises and lowers the coupled clamp, spacer, and cup when the clamp is in loosened state. The telescopic pole also turns the cup in a first direction to expand the spacer and push the bracket away from the vertical pole, thus tightening the clamp about the vertical pole. The telescopic pole also turns the cup in a second direction to contract the spacer, thus loosening the clamp about the pole.

20 Claims, 2 Drawing Sheets

TELESCOPIC POLE MOUNTING SYSTEM

CROSS REFERENCE TO RELATED APPLICATIONS

The present disclosure is related to provisional patent application No. 62/600,358 filed with the United States Patent & Trademark Office on Feb. 21, 2017.

FIELD OF THE DISCLOSURE

The present disclosure is in the field of semi-permanently mounting cameras and other devices to vertical poles or other fixed objects. More particularly, the present disclosure provides systems and methods of moving a device up and down along a length of a vertical pole using a telescopic pole and affixing the device to the vertical pole to promote monitoring by the camera.

BACKGROUND OF THE DISCLOSURE

Cameras and other equipment for monitoring vehicular traffic, human movement, and other activity often need to be positioned at heights that allow such devices to capture a wide range of activity. Such cameras are often mounted on semi-permanent stationary poles, for example vertical poles that hold street lamps, traffic lights, and/or communication lines. Positioning and mounting cameras on such vertical poles can be problematic. Ladders or scaffolding devices may be used for manual attachment of devices. Such methods can be expensive and dangerous. Cameras and other devices may alternatively be mounted on free-standing temporary tripod-type vertical poles. However, such vertical poles may be knocked over or moved by wind and other elements, and attached cameras may then not capture data accurately. Further, temporary vertical poles can be knocked over by passing traffic or compromised via vandalism.

SUMMARY OF THE DISCLOSURE

In an embodiment, A telescopic pole mounting system is provided. The system comprises an adjustable spacer, a first end of the spacer coupled to a bracket and a clamp that partially encircles a vertical pole, ends of the clamp attached to the bracket. The system also comprises a cup attached to the spacer, movement of the cup causing one of expansion and contraction of the spacer. The system also comprises a telescopic pole that attaches to the cup, and raises and lowers the coupled clamp, spacer, and cup when the clamp is in loosened state. The telescopic pole also turns the cup in a first direction to expand the spacer and push the bracket away from the vertical pole, thus tightening the clamp about the vertical pole. The telescopic pole also turns the cup in a second direction to contract the spacer, thus loosening the clamp about the pole.

DETAILED DESCRIPTION OF THE INVENTION

Systems and methods described herein provide for a device to be moved to a desired location on a vertical pole or tall vertical post and affixed at the desired location on the pole or post using an adjustable clamp partially encircling the vertical pole. An adjustable spacer that may be expanded and contracted via turning of an attached cup tightens and loosens, respectively, the clamp about the pole. At an end of the spacer opposite the clamp, a bracket is held that itself may hold or otherwise support a camera or other equipment.

The device, comprising at least an adjustable spacer, a cup, brackets, and a clamp, is raised and lowered along the vertical length of the vertical pole by a telescopic pole. One end of the telescopic pole attaches to the cup. The telescopic pole turns the cup in a first direction to expand the adjustable spacer which in many embodiments moves horizontally. The telescopic pole turns the cup in a second and opposite direction to contract the adjustable spacer.

The end of the spacer away from the vertical pole is attached to a bracket to which ends of the clamp are in turn attached. The clamp partially encircles the vertical pole or post to which the entire device is to be affixed. When the spacer is being expanded, the spacer pushes the bracket, and thus the ends of the clamp, away from the vertical pole. This action causes the clamp to tighten and affix the device tightly to the vertical pole. The camera or other equipment attached to the bracket may then begin to record or otherwise commence activity.

When the cup is turned by the attached telescopic pole in the opposite direction, the adjustable spacer to which the cup is attached then contracts. This action causes the bracket to be pulled back toward the vertical pole. The clamp is thus loosened. The entire device is then thereby allowed to be lowered to the ground or otherwise moved up or down along the length of the vertical pole.

The telescopic pole may be a long, narrow pole made of metal, wood, composite, or other material. It may be sectional such that it may be expanded for movement of the device and collapsed when not in use. The telescopic pole may be used manually by a human user or mechanically to raise and lower the device, affix the device to the vertical pole, or loosen the device therefrom.

Figure 1:
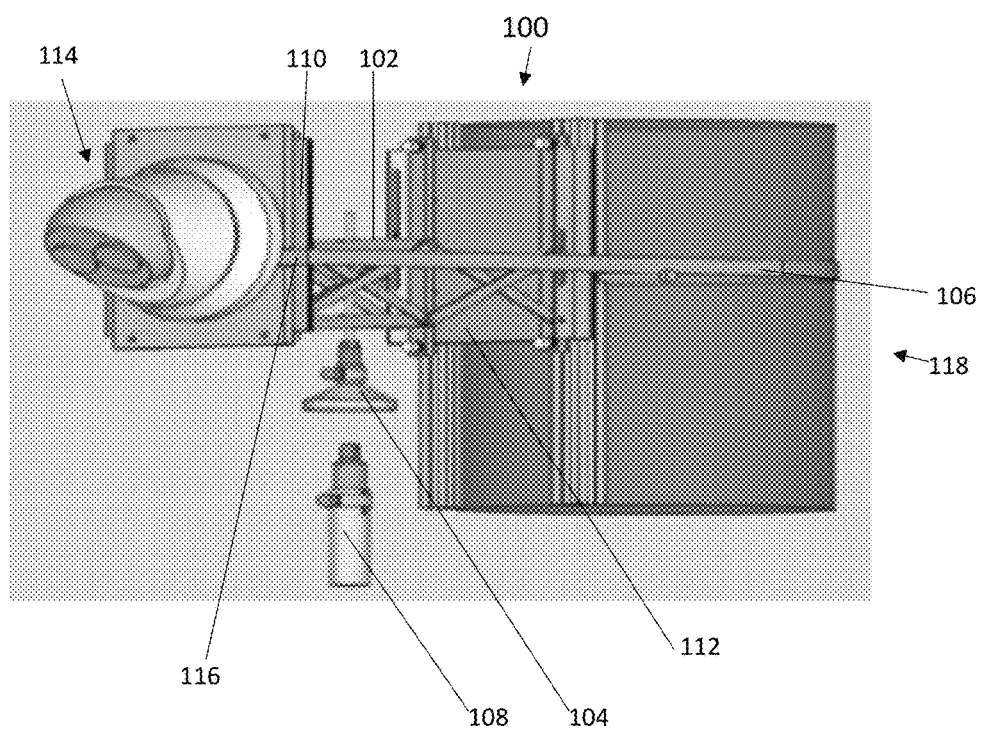
FIG. 1 is a diagram of a system of a telescopic pole mounting device according to an embodiment of the present disclosure.

Turning to the figures, FIG. 1 is a diagram of a telescopic pole mounting device in accordance with an embodiment of the present disclosure. FIG. 1 depicts components of a system 100 of the telescopic pole mounting device.

The system 100 comprises an adjustable spacer 102, a cup 104, a clamp 106, a telescopic pole 108, a first bracket 110, a second bracket 112, and clamp ends 114, 116. The adjustable spacer 102 may be referred to herein for brevity as the spacer 102. For discussion and brevity purposes, the components of the system 100 except for the telescopic pole 108 may be referred to collectively as the device 118. Clamp ends 114, 116 may be referred to for brevity purposes as ends 114, 116.

The spacer 102 in embodiments is a scissoring jack-like device that expands and contracts via turning of the cup 104 that is attached to the spacer 102. The spacer 102 consists of metal components coupled in a scissor-like shape. The spacer 102 functions mechanically by having the cup 104 connected to a central piece of metal between two layers of crossing metal pieces of the spacer 102. The cup 104, with a screw-like component, performs a similar task as screws in a hydraulic lift, supporting the metal pieces in withstanding the oppressing weight, force, or resistance. The spacer 102 in most embodiments of the present disclosure, however, is horizontal while a lift is usually vertical. Turning the cup 104 may increase and decrease angles between the metal pieces, resulting in extension and contraction of the length of the spacer 102.

In embodiments, when the cup 104 is turned in a clockwise direction, the spacer 102 expands. When the cup 104 is turned in a counter clockwise direction, the spacer 102 contracts.

The clamp 106 is a band-like component that wraps partially around a circumference of a vertical pole to which the device 118 is to be affixed. The clamp 106 may be constructed from metal or other material and may be about three inches in width. In embodiments, the ends 114, 116 of the clamp 106 do not physically touch each other but are rather separately affixed to the first bracket 110. The first bracket 110 and the attached ends 114, 116 may be pushed away from the vertical pole by expanding action of the spacer 102, thus causing tightening of the clamp 106. The first bracket 110 and the ends 114, 116 may conversely be pulled toward the vertical pole by contracting action of the spacer 102, thus loosening the clamp 106. As noted, the ends 114, 116 of the clamp 106 in most embodiments do not couple to the spacer 102 but instead couple to the first bracket 110 which itself couples to and is moved by action of the spacer 102. In FIG. 1, the clamp end 114 is not visible as it is obscured by the camera.

The telescopic pole 108 attaches to the cup 104 and is used to turn the cup 104. An end of the telescopic pole 108 proximate a floor or ground surface may be held and turned by a user, by a mechanical device, or via other means. The opposite end, i.e. the end of the telescopic pole 108 far from the user or mechanical device, may be shaped in a way that fit firmly into the cup 104 and permits turning of the cup 104 as described herein.

The spacer 102 attaches to the first bracket 110 and the second bracket 112. The first bracket 110 is disposed at a first end of the spacer 102 away from the vertical pole to which the device 118 is to be attached. The second bracket 112 is disposed at a second end of the spacer 102 proximate the pole. The first bracket 110 may hold or otherwise provide support for a camera or other monitoring device that may be used to monitor traffic, for example. As noted, the first bracket 110 holds the ends 114, 116 of the clamp 106.

The second bracket 112 may attach to the end of the spacer 102 proximate the vertical pole. Contraction or expansion of the spacer 102 causes the first bracket 110 to move the ends 114, 116 closer or farther, respectively, from the vertical pole, thus loosening or tightening, respectively, the clamp 106 about the pole. In embodiments, the second bracket 112 may be an optional component of the system 100 such that components of the spacer 102 at the second end of the spacer 102 proximate the pole may contact the vertical pole directly in some fashion.

As noted, clockwise turning of the telescopic pole 108 and hence the cup 104 may cause the spacer 102 to expand. Conversely, counterclockwise turning of the telescopic pole 108 and hence the cup 104 may cause the spacer 102 to contract. In an alternate embodiment, the reverse of this configuration may be the case such that clockwise turning of the telescopic pole 108 and hence the cup 104 may cause the spacer 102 to contract. And conversely in this alternate embodiment, counterclockwise turning of the telescopic pole 108 and hence the cup 104 may cause the spacer 102 to expand.

Figure 2:
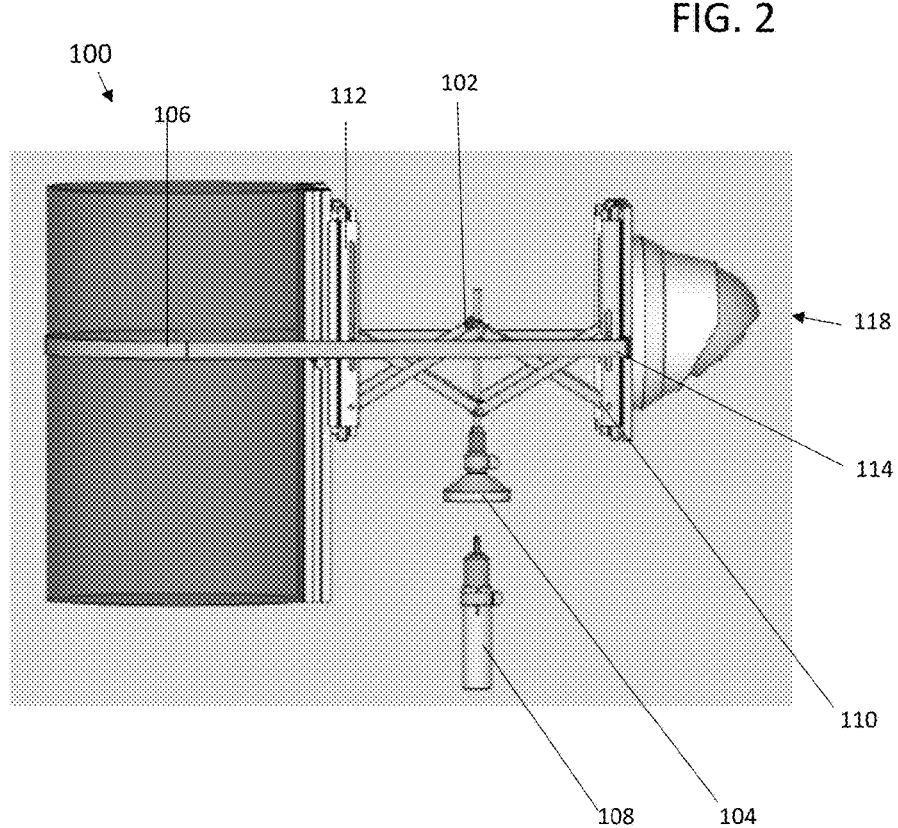
FIG. 2 is a diagram of a system of a telescopic pole mounting device according to an embodiment of the present disclosure.

FIG. 2 is a diagram of a telescopic pole mounting device in accordance with an embodiment of the present disclosure. FIG. 2 depicts components of the system 100 of the telescopic pole mounting device from an entirely side view of the spacer 102. The components depicted in FIG. 2 are the same as those components depicted in FIG. 1. The end 116 is fully obscured in FIG. 2 as the end 116 is on the far side of the device 118. Therefore, while still present in the device 118, the end 116 is not indicated in FIG. 2.

The vertical pole to which the device 118 attaches via tightening and loosening of the clamp 106 may be a pole or post that supports street lighting or other types of lighting and/or may hold traffic signaling devices, air quality measurement devices, wildlife observation devices, aircraft observation devices, or virtually any other device or object that needs to be suspended over the ground or a floor surface. The vertical pole may be constructed from wood, metal, or another material. While embodiments described herein are based on the pole being circular in circumference shape, some embodiments provide for a non-circular shape of circumference. In such cases, shaping of the clamp 106 may be modified to accommodate such shape of the vertical pole.

While FIG. 1 depicts what may appear to be vertical tracks on the vertical pole that the second bracket 116 may adhere to and effectively ride in while the device 118 is moving, such tracks are depicted for discussion purposes only. The vertical tracks are an entirely optional component only. The device 118 moves up and down the vertical pole without need for the tracks depicted in FIG. 1.

In some cases, the vertical pole may not have a smooth surface. The device 118 may therefore not be easily slid up and down the pole for positioning and affixing or removal as described herein. The pole may have flanges, bolts or other protrusions that hinder or entirely block movement of the device 118 up and down the pole by action of the telescopic pole 108.

Embodiments described to this point have provided that the clamp 106 encircles the pole in an effectively closed state such that the clamp 106 is tightly or loosely fastened about the circumference of the pole and the ends 114, 116 of the clamp 106 are held by the first bracket 110. In such cases in which the surface of the pole prevents the clamp 106 from being closed even loosely about the pole as the device 118 is moved, mechanisms can be provided such that the clamp 106 does not encircle the pole during raising or lowering of the device 118. The mechanisms cause the clamp 106 to encircle the vertical pole and connect in a closed manner when the device 118 is to be affixed or become disconnected when the device 118 is to be detached from the vertical pole and lowered or otherwise moved.

Embodiments described herein to this point have also been based on the vertical pole to which the device 118 is attached being fixed in a vertical manner, i.e. affixed to a ground, floor or other surface and pointed in an upward direction. The present disclosure provides for embodiments wherein the vertical pole is not vertical and may instead, for example, be partially or completely horizontal. The vertical pole may, for example, be placed into a long, narrow, and horizontal drain or shaft such that the vertical pole is no longer vertical. The device 118 may be positioned for use as described herein at a far end of the vertical pole. A camera affixed to the first end 110 of the device 118 may capture images of the interior of the drain or shaft for various purposes.

What is claimed is:

1. A telescopic pole mounting system, comprising:
an adjustable spacer, a first end of the spacer coupled to a bracket;
a clamp that partially encircles a vertical pole, ends of the clamp attached to the bracket;
a cup attached to the spacer, movement of the cup causing one of expansion and contraction of the spacer; and
a telescopic pole that:

attaches to the cup, and raises and lowers the coupled clamp, spacer, and cup when the clamp is in loosened state, turns the cup in a first direction to expand the spacer and push the bracket away from the vertical pole, thus tightening the clamp about the vertical pole, and turns the cup in a second direction to contract the spacer, thus loosening the clamp about the pole.

2. The system of claim 1, wherein a second end of the spacer is opposite the first and is positioned against the vertical pole.

3. The system of claim 2, wherein the bracket supports at least one of a camera, a noise detector, an environmental quality measurement device, a traffic signaling device, wildlife observation devices, aircraft observation devices, and virtually any other device or object that needs to be suspended over the ground or a floor surface.

4. The system of claim 1, wherein a first end of the telescopic pole couples to the cup, thus promoting turning of the cup.

5. The system of claim 1, wherein a second end of the telescopic pole is proximate one of a ground surface and a floor surface supporting locomotion of the telescopic pole.

6. The system of claim 5, wherein the locomotion comprises at least one of mechanical and non-mechanical turning of the telescopic pole and raising and lowering of the coupled clamp, spacer, and cup.

7. The system of claim 1, wherein the first direction is clockwise and the second direction is counterclockwise.

8. A method comprising:
a clamp partially encircling a vertical pole;
a first end of an adjustable spacer coupling to a bracket, the bracket coupling to ends of the clamp;
a cup attached to the spacer causing, via movement of the cup, one of expansion and contraction of the spacer; and
a telescopic pole attached to the cup, the telescopic one of raising and lowering the coupled clamp, spacer, and cup when the clamp is in loosened state,
the telescopic pole turning the cup in a first direction to expand the spacer and push the bracket away from the vertical pole, thus tightening the clamp about the vertical pole, and
the telescopic pole turning the cup in a second direction to contract the spacer and pull the bracket toward the vertical pole.

9. The method of claim 8, further comprising second end of the spacer disposed opposite the first end and positioned against the vertical pole.

10. The method of claim 9, further comprising the bracket supporting at least one of a camera, a noise detector, an environmental quality measurement device, a traffic signaling device, wildlife observation devices, aircraft observation devices, and virtually any other device or object that needs to be suspended over the ground or a floor surface.

11. The method of claim 8, further comprising a first end of the telescopic pole coupling to the cup and promoting turning of the cup.

12. The method of claim 8, further comprising a second end of the telescopic pole disposed proximate one of a ground surface and a floor surface and supporting locomotion of the telescopic pole.

13. The method of claim 12, further comprising the locomotion comprising at least one of mechanical and non-mechanical turning of the telescopic pole and raising and lowering of the coupled clamp, spacer, and cup.

14. The method of claim 8, wherein the first direction is clockwise and the second direction is counterclockwise.

15. A method, comprising:
a telescopic mounting device receiving positioning at a first location on a vertical pole;
the device receiving a first turning motion causing the device to tighten a band component partially encircling a circumference of the vertical pole thus tightly coupling the device to the vertical pole;
the device receiving a second turning motion causing the device to loosen the band component, thus reducing the tightness of the coupling; and
the device receiving positioning at a second location on the vertical pole.

16. The method of claim 15, further comprising the device receiving the positioning via manipulation of a telescopic pole.

17. The method of claim 16, further comprising a first end of the telescopic pole coupling to the device for application of the first turning motion and the second turning motion.

18. The method of claim 15, further comprising the turning motions to one of cause an adjustable spacer component of the device to one of expand and contract.

19. The method of claim 18, further comprising expansion of the spacer component causing the band component to tighten about the circumference of the vertical pole.

20. The method of claim 18, further comprising contraction of the spacer component causing the band component to loosen about the circumference of the vertical pole.

* * * * *